United States Patent [19]

Hartmann et al.

[11] 4,133,511

[45] Jan. 9, 1979

[54] ELECTRO-HYDRAULIC REGULATING VALVE SYSTEM

[75] Inventors: Georg Hartmann, Marloffstein; Adam Dittner, Hockstadt; Karl Prenzel, Nuremburg, all of Germany

[73] Assignee: Frieseke & Hoepfner GmbH, Erlangen-Bruck, Germany

[21] Appl. No.: 762,482

[22] Filed: Jan. 26, 1977

[51] Int. Cl.² .................... F15B 13/044; F16K 31/02
[52] U.S. Cl. ............................. 251/133; 137/487.5; 137/625.65; 251/215
[58] Field of Search ................ 137/487.5, 625.65; 251/133, 134, 215, 324

[56] References Cited

U.S. PATENT DOCUMENTS

| | | | |
|---|---|---|---|
| 3,756,282 | 9/1973 | Knutson | 137/625.65 X |
| 3,819,292 | 6/1974 | Wentworth | 137/487.5 X |

FOREIGN PATENT DOCUMENTS

| | | | |
|---|---|---|---|
| 2456677 | 6/1976 | Fed. Rep. of Germany | 137/625.65 |
| 2602375 | 7/1977 | Fed. Rep. of Germany | 137/625.65 |

*Primary Examiner*—Martin P. Schwadron
*Assistant Examiner*—Gerald A. Michalsky
*Attorney, Agent, or Firm*—Toren, McGeady and Stanger

[57] ABSTRACT

In the disclosed system a motor axially displaces a screw-threaded movable valve member by rotating it within an interiorly threaded collar. A sensor detects the movable valve member's axial position. An electrical feed-back circuit compares the sensor output with a reference value and drives the motor accordingly. In one embodiment the motor possesses a disc rotor and in another embodiment a moving coil rotor. In each case the stator links the rotor conductors which extend radially from the rotor center.

9 Claims, 4 Drawing Figures

ELECTRO-HYDRAULIC REGULATING VALVE SYSTEM

BACKGROUND OF THE INVENTION

This invention relates to hydraulic regulating valves and particularly to electro-hydraulic regulating valves.

Known electro-hydraulic regulating valves are composed of relatively delicate or critical components. An example of a control valve of this type appears in German Pat. No. 1,195,116. Such valves include a preamplifier stage which in turn regulates a main control stage with its own valve control members. The preamplifier stage is provided with regulating jets. The latter have very small orifice diameters which range in the order of 0.1 mm. This makes these jets extraordinarily sensitive to contamination and fouling, and oblige extremely fine filtering of the hydraulic fluid. Ultimately these factors complicate the construction of such valves, make adjustment difficult, and cause the valves to be expensive. While such valves may be operated at adequately high regulating speeds, they are not suited for extensive and rough treatment of the kind they would receive in motor vehicles.

An object of the invention is to improve electrohydraulic control valves and systems for their use.

Another object of the invention is to avoid the aforementioned disadvantages.

Another object of this invention is to provide an electrohydraulic control valve and a system therefor which avoids the aforementioned disadvantages, which nevertheless retains an equivalent fast regulation response, and yet displays a high degree of insensitivity to pressure variations and contamination of the hydraulic fluid.

Yet another object of the invention is to provide the aforementioned in an economic structure utilizing sturdy components.

Still another object of the invention is to furnish the above so that the valve arrangement is particularly well suited for mobile applications, such as use in motor vehicles.

SUMMARY OF THE INVENTION

According to a feature of the invention these objects are at least partially attained by coupling the moving portion of the valve, i.e. the valve spool or blocking member, to a motor armature and sensing the movement of the valve stem with a detector. For purposes of this specification, the stationary casing of the valve is referred to in the conventional manner as the valve body. The moving closure member, such as the valve spool or blocking member, that blocks and opens various ports, bores, or openings in the valve body is referred to generally as the valve plug or valve gate.

According to another feature of the invention external threads on the valve plug engage internal threads on the surrounding valve body so that rotary movement of the rotor imparts axial movement to the valve plug.

According to another feature of the invention, an electrical control arrangement responds to the detector and controls the motor so as to form a loop.

According to another feature of the invention, the motor includes a printed circuit disc armature with at least one laterally located stator magnet.

According to another feature of the invention, the motor includes a flat rotor coil surrounding an iron short circuit plate and having like poles permanent magnets in the voids opposite the sides of the short circuit plate. According to another feature of the invention, the motor's rotor and valve plug form a rotationally rigid structure supported by hydraulic friction bearings.

According to a more specific aspect of the invention, the valve plug has a rotationally rigid connection to the rotor, which is fabricated as a printed circuit disc armature with at least one lateral stator magnet or as a moving coil rotor surrounding a short circuit plate and is provided with like poles permanent magnets in the voids on opposite sides of the short circuit plate, so that the rotor and valve stem form a unitary structure which is supported by a hydraulic friction bearing, one end of the valve plug together with an electrical sensor providing a valve motion pick-up which, along with the rotor, is formed into an electrical control loop.

The disc rotors are of the type used in disc armature motors. There the rotors include a disc of insulating material with conductors on both sides thereof. The coil rotor is of the type used in moving coil measuring instruments. The use of the disc armature together with other components of a disc armature motor, such as a stator, etc., reduces the system's angular moment of inertia to a very small value. Use of the aforementioned flat moving coil as a rotor allows a still further reduction in the moment of inertia. At the same time, a moving coil produces a higher torque than a moving disc rotor. Both exhibit a particularly high regulation speed or frequency limit. It is easy to optimize the relationship of torque to inertia in such moving coils by finding the most suitable radial dimension relative to the axial length.

According to another feature of the invention, the hydraulic friction bearing for the entire rotational system includes a hydrostatic bearing whose individual components are subject to the pressure of the hydraulic oil supply to the valve. Preferably, such a hydrostatic bearing is always provided when the moving plug does not include cylindrical closure elements, i.e. is not a valve spool.

According to another feature of the invention, the plug is in the form of a valve spool and the hydraulically centered piston shaped spool lands are simultaneously utilized to support the entire rotational system. Additional supports are therefore unnecessary. This significantly reduces the cost.

According to another feature of the invention, one end of the valve plug coacts with a plug-position indicating sensor which is combined with the rotor into a control loop that includes suitable setting means, a comparator for comparing the reference value set by the setting means with the actual sensed value of the valve stem, and a control amplifier. Because there are no additional constraints for permitting a high limit frequency, the regulation speed or response is not limited.

These and other features of the invention are pointed out in the claims. Other objects and advantages of the invention will become evident from the following detailed description when read in light of the accompanying drawings.

DETAILED DESCRIPTION OF PREFERRED EMBODIMENTS

Figure 1:
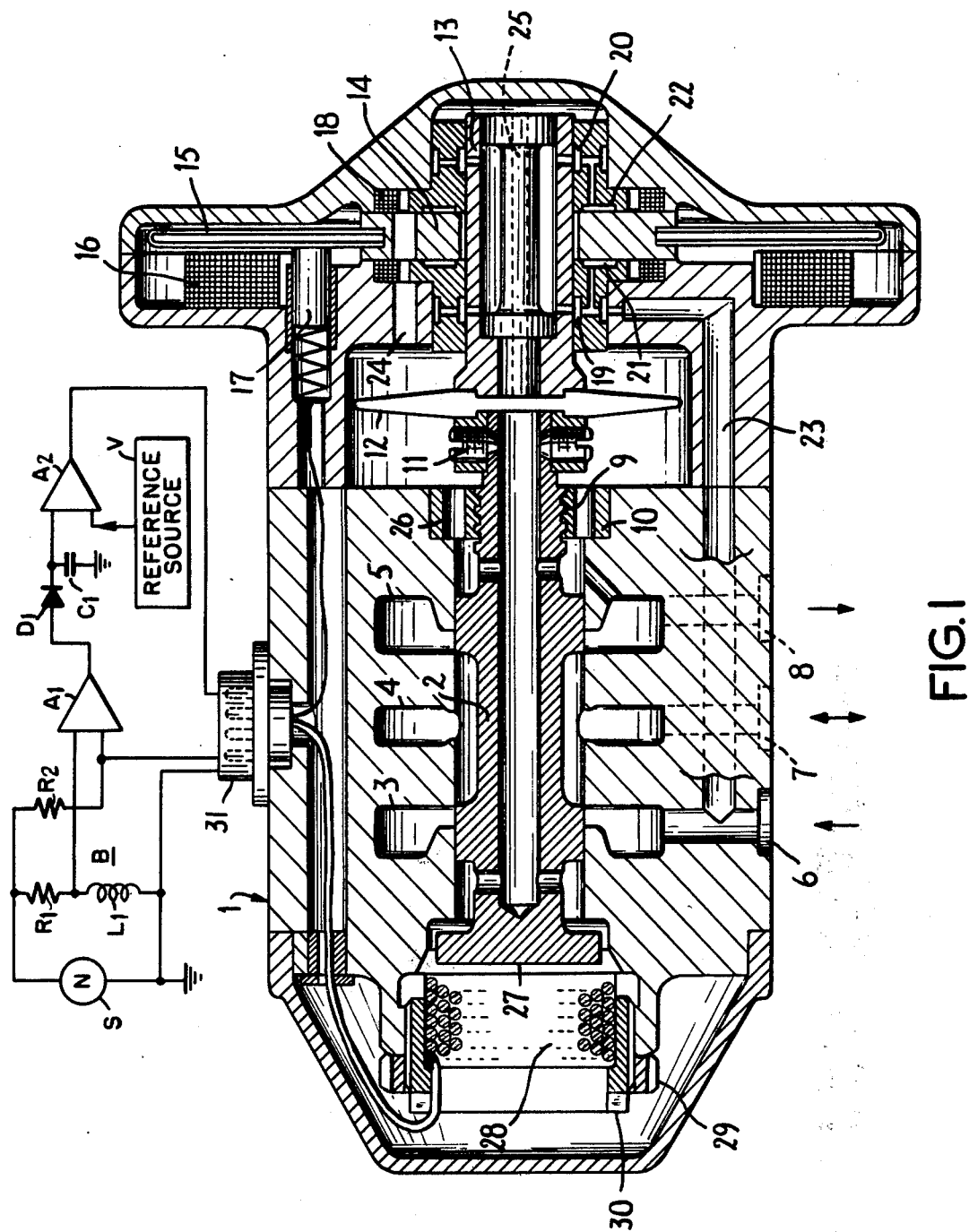
FIG. 1 is a partially sectional and partially schematic drawing of a system embodying features of the invention and including a regulating valve having a moving disc motor, separate hydrostatic bearings as well as a piston shaped valve stem.

In FIG. 1, a generally cylindrical housing 1 contains valve plug 2 in the form of a concentric cylindrical valve spool. The latter is composed of cylindrical closure members or "lands" and "grooves" which respectively block and communicate with valve chambers 3, 4, and 5. Suitable bores connect the chambers with openings 6, 7, and 8. A thread 9 at the right end of the valve spool 2 engages a stationary threaded ring or nut 10.

A screw joint 11 and a cup spring 12 rigidly connect the valve spool 2 to a shaft 13 extending to the right. This shaft supports the hub 14 of the rotor 15 of a known moving disc motor. Permanent magnets 16 lie adjacent the rotor 15. One carbon current-supply brush 17 is illustrated. A packing 18 seals the hub 14 in the usual manner.

The hub 14 is secured for rotation upon the shaft 13. Radial hydrostatic bearings 19 and 20 and axial hydrostatic bearings 21 and 22 support both the shaft 13 and hub 14. A channel 23 connected to the opening 6 supplies forced circulating lubrication to the bearings. Return channels 24, 25, and 26, carry return oil and are not further described on an individual basis.

The left side of the valve body terminates in a plane surface 27. This surface faces an induction coil 28. The distance between the coil 28 and the surface 27 can be changed or adjusted by loosening a locking ring 29, and an appropriate tool is attached to an adjuster 30.

The surface 27 and the coil 28 coact to provide an inductive motion pick-up responsive to the axial displacement of the valve body. A connector 31 receives the leads from the coil 30 as well as from the carbon current-supply brushes that contact the moving disc rotor of the motor.

The inductor 28 forms one arm of a bridge B, whose other arms are composed of an inductor $L_1$, a resistor $R_1$ and a resistor $R_2$. An alternating source S energizes the bridge. Movement of the face 27 relative to the inductor 28 varies the inductance of the coil. The unbalance in the bridge B, caused by the instantaneous inductance of the inductor 28 is sensed by a differential amplifier $A_1$ whose output corresponds to the bridge unbalance. A diode $D_1$ and a capacitor $C_1$ rectify and smooth the output of the amplifier $A_1$. This produces a direct voltage corresponding to the bridge unbalance, and this value is an indication of the inductance of the inductor 28. A comparator amplifier $A_2$ compares the rectified bridge unbalance to a reference voltage from a source V. The latter may be an electronic source responding to a signal, or the voltage at source V at the tap of an adjustable resistor whose ends are a manually set tap of a potentiometer energized by a potential. The output of the amplifier $A_2$ therefore represents the departure of the bridge unbalance, and hence the departure of the inductance of inductor 28, from the reference value. This output is applied to the brush 17 and drives the rotor 15.

Depending upon the voltage at the reference source V, the rotor 15 drives the valve stem. This changes the position of the face 27 and hence the inductance of inductor 28. The unbalance of the bridge B is then altered and the output from amplifier $A_2$ to the motor changed. This continues until the valve stem 2 reaches an equilibrium position where the inductor 28 unbalances the bridge B to a point where the output of the diode $D_1$ equals the reference voltage at the source V so that the amplifier $A_2$ furnishes no further voltage to the rotor 15. In this equilibrium position no further motion takes place.

Figure 2:
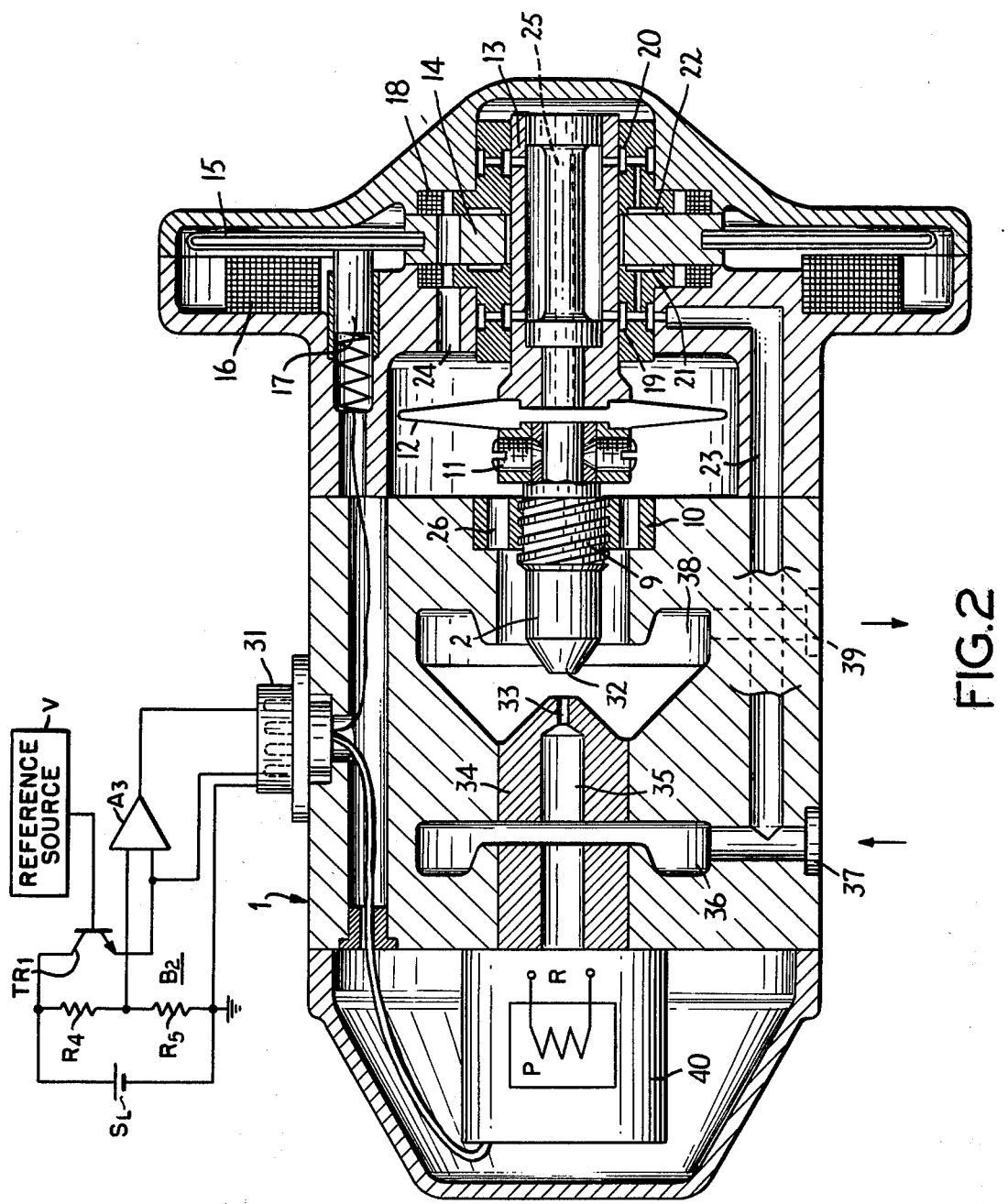
FIG. 2 is a partially sectional and partially schematic drawing embodying features of the invention and including a valve with a moving disc motor and separate hydrostatic bearings, with the valve operating as a simple pressure regulator.

The arrangement in FIG. 2 differs from that in FIG. 1 only in the following respects. In FIG. 2 the circuitry is somewhat simplified. Also, the structures of the parts to the left of the thread 9 do not include a valve spool with piston shaped closure lands, but rather a valve plug with a blocking body 32 which coacts with a jet or nozzle 33. The latter is seated in a nozzle tube 34 forming a channel 35. This channel communicates with a chamber 36 that terminates in a pressure fluid connection 37. Correspondingly the space about the impact body 32 communicates with the valve chamber 38 which discharges into the output connections 39. Finally, a pressure sensor 40 in communication with the channel 35 of the nozzle tube 34 detects the pressure in the channel. Here, in contrast to control nozzles in the precontrol loop of known regulating valves, the nozzle 33 appears in the main current of the hydraulic fluid. Therefore, the present nozzle has a substantially larger diameter and for this reason is fairly insensitive to fouling.

When voltage is applied to the motor 15 of the moving disc motor through the current supplying brushes it causes the rotor 15 to interact with the stator 16 and hence revolve. The rotor 15 and shaft 13 impart a rotary motion to the cup spring 12 which in turn transmits it to the valve plug 2 through the screw coupling 11. By virtue of the threads 9 and 10, and the axial compliance of the cup spring 12, the valve plug 2 is not only turned but also shifted in the axial direction. The axial stem position determines the distance between the blocking body 32 and the nozzle 33.

The valve of FIG. 2 is in the form of a pressure valve, wherein the pressure in the chamber 36 and chamber 35 is adjusted on the basis of the distance between the nozzle 33 and the blocking body 32. Hence, the pressure in the channel 35 represents the axial displacement of the blocking body 32. Furthermore, because the channel 35 is pressure coupled to the sensor 40, the latter exhibits an electrical analog of the blocking body displacement movement.

The pressure sensor 40 indicates the pressure and pressure variations by its output resistance and corresponding resistance variations. The resistance of the pressure sensor 40 forms part of a bridge $B_2$ composed of two fixed resistors $R_4$ and $R_5$ and a transistor $TR_1$ that forms a variable reference resistor. A voltage source $S_L$ energizes the bridge. The resistance of transistor $TR_1$ is determined by the reference source V. The bridge unbalance indicates the departure of the pressure sensor resistance from the reference value established by the reference resistor source in transistor $TR_1$. A differential amplifier $A_3$ imparts the unbalance through the brushes 17. The latter apply these to the rotor 15 and turn the moving disc motor.

The rotating motor imparts rotary motion to the shaft 13, the cup spring 12, and the plug 2. The latter moves axially as the result of the threads 9 and 10. This readjusts the body 32 relative to the nozzle 33. The sensor 40 now causes the bridge unbalance to change, which in turn changes the output of the amplifier $A_3$ and hence the motor operation. This feedback arrangement continues until the body 32 is spaced from the nozzle 30 a distance established by the reference source V. The reference resistor may be changed as required.

Figure 3:
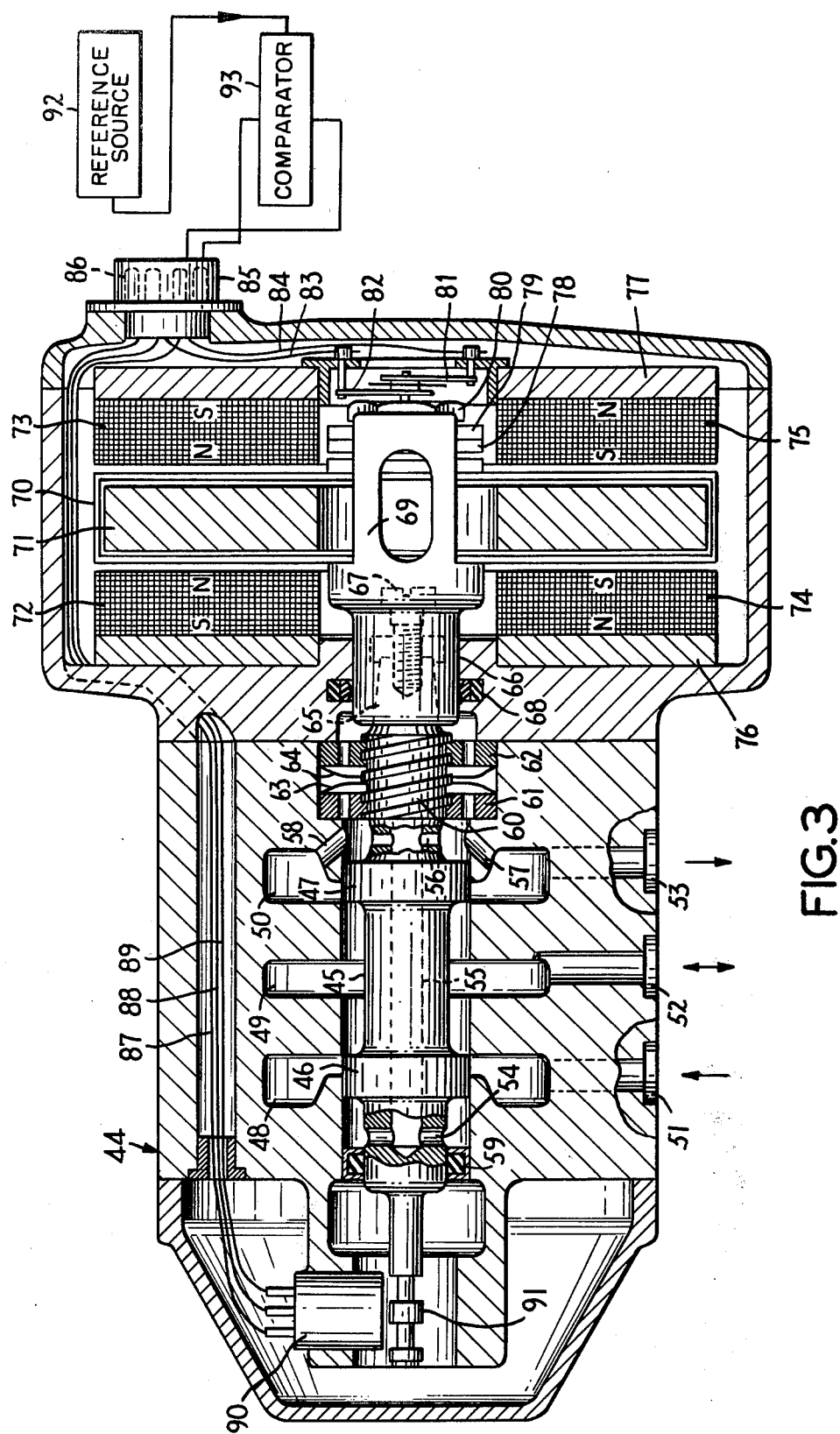
FIG. 3 is a partially sectional and partially block drawing of a system embodying the invention and using a moving coil rotor with bearing support from available roller shaped valve closure members.

In FIG. 3 a valve plug 45, disposed in the valve housing 44, is in the form of a valve spool. The latter possesses cylindrical shut-off lands 46 and 47, and grooves which communicate with the valve chambers 48, 49 and 50. The latter are connected with supply port openings 51, 52 and 53. Channels 54, 55 and 56 communicate with channels 57 and 58 to divert excess oil to a port opening 53 which is normally intended for the connection of the pressure medium reservoir. The valve stem 45 is sealed at the left by the seal 59.

The valve plug 45 at its right possesses threads 60 which engage mating threads in supports 61 and 62. Of the latter the threaded support 61 is stationary or permanently inserted within valve housing, while the threaded support 62 is under pressure from the cup springs 63 and 64. Together these springs maintain the threaded supports 61 and 62 under pressure to prevent axial thread backlash or play.

The thread 60 continues to the right as a taper sleeve 65 which enters a corresponding recess in a collar 66 where it is rigidly held by means of a screw 67. A seal 68 seals the collar 66 without a bearing. The collar 66 continues toward the right as a forked member 69. The latter serves for mounting the flat rotor coil 70.

The rotor coil 70 surrounds an iron short circuit plate 71. Sector shaped permanent magnets 72, 73, 74 and 75 with annular short circuit plates 76 and 77 on the backs thereof oppose the plate 71. As can be seen, the poles of the magnets are arranged to have similar poles on opposite sides of the iron shorted circuit plate 71. This forms four air gaps, in which the rotor coil 70 moves.

Spacers 78 and 79 and the fastening nut 80 restrain the rotor coil 70 in the fork 69. Here the spiral springs 81 and 82, which are connected to pins 86 of the connector 85 through conductors 83 and 84, supply current to the coil 70. The pins 86 of connector 85 are connected to a motion pickup 90 through conductors 87, 88 and 89. This motion pickup contains a pair of a differentially connected magnetically responsive, resistors, whose magnetic equilibrium is varied by a ring projection 91 which is located on the left end of the valve spool 45. The pickup 90 indicates the valve plug motion magnetically.

The conductors 87, 88, and 89 connect the differentially coupled resistors of the motion pickup 90 to the pins 86 of the connector 85. Thus a representation or analog of the valve body 45 position appears at the pins 87 to 89. This representation constitutes an actual value which a comparator 93 compares to a reference voltage established at input 92. The comparator 93 controls the rotor coil 70 through the conductors 83, 84. The latter complete the electrical control loop.

The system in FIG. 3 is analogous to that of FIG. 1. When the rotor coil 70 is acted upon by a potential through the conductors 83 and 84 it rotates. This motion is transmitted to the thread 60 by the collar 66 and from there to the valve spool 45. The thread elements 60, 61 and 62 cause the valve spool 45 to rotate and move in the axial direction. This furnishes a connection between the ports 51 and 52 or 52 and 53.

The rotor coil 70 also moves axially. The total rotational system is only supported by the valve spool 45 cylindrical lands 46 and 47. The latter are continually recentered hydraulically through the excess oil film which is newly formed for each displacement. The magnitude of the valve spool 45 axial displacement is therefore determined by the motion pickup 90 because the magnetic equilibrium of the differential magnetically sensitive resistance contained therein is changed.

Figure 4:
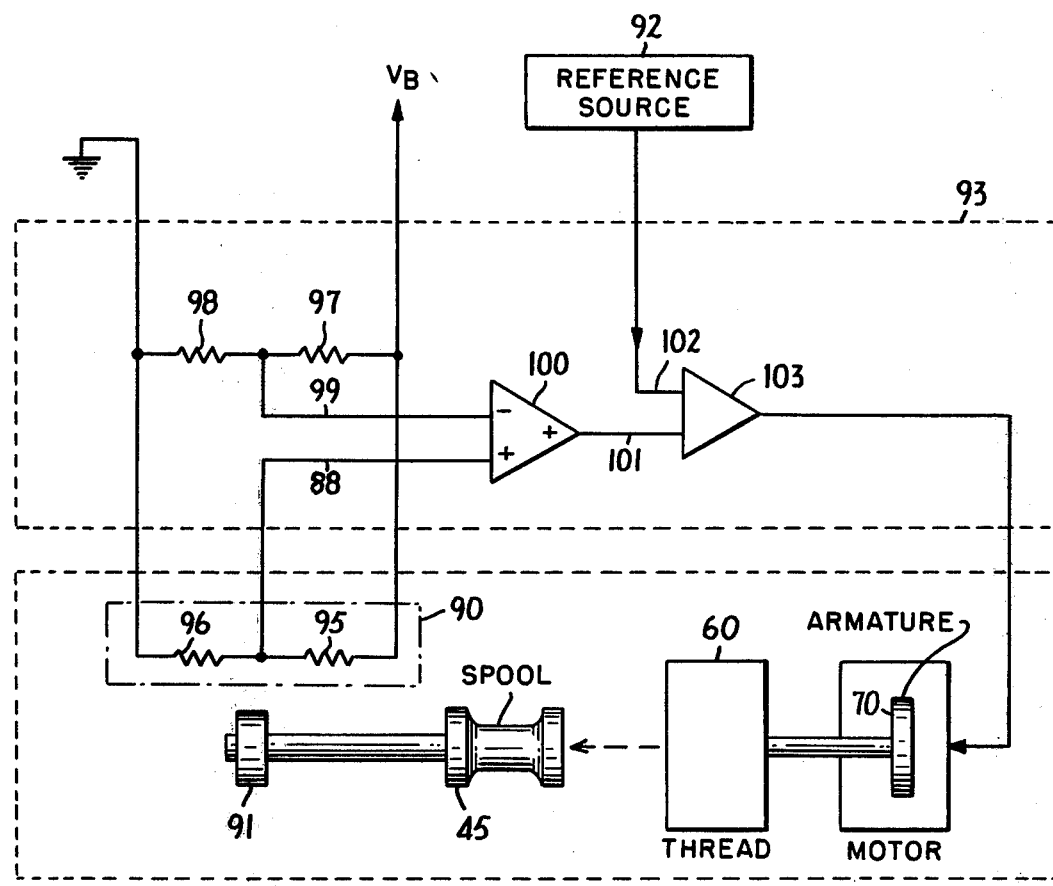
FIG. 4 is a schematic diagram of the system in FIG. 3.

FIG. 4 shows the essential details of the comparator 93 as it cooperates with the other elements of the system.

The differential flux sensitive pick-up 90 is composed of two magnetically controllable semi-conductor resistances 95 and 96. These together with two ohmic resistors 97 and 98 form a bridge. The latter is connected between ground and a potential source $V_B$.

Leads 88 and 99 connect the junction points of these resistances to an operational amplifier 100 forming part of the comparator 93. The amplifier 100 responds to the bridge unbalance. It serves as a differential amplifier and amplifies any potential differences across the bridge diagonal.

A lead 101 applies the output of amplifier 100 to the input of a second operational amplifier 103 in the comparator 93. The reference voltage from source 92 is applied to the lead 102 of the amplifier. The source 92 sets the reference voltage either electronically in response to an outside source or manually. In the manual mode the reference voltage is taken at the top of a potentiometer which is energized by a voltage source. The output of the amplifier 103 directly drives the armature 70 of the motor in the valve. The armature 70 turns the threads 60 which moves the spool 45 axially. The pickup 90 senses movement of the ring 91 which moves with the spool 55.

The identified components form a control loop. The part of the identified control loop between the armature 70 and the differential magnetically responsive pickup 90 is completed through the mechanical elements of the valve.

The operation of the control loop is easily understood. If a null potential exits across the diagonal of the bridge composed of resistances 95 thru 98, a null potential also prevails at the output of the operational amplifier 100. Now if a null reference potential is likewise applied to the input 102 of the second operational amplifier as the nominal or set point value, the output potential of this operational amplifier is likewise zero or null. The null reference potential closes the valve of FIGS. 2 and 3 by placing the valve spool in its mid-position shown.

If at this time the reference voltage at line 102 changes in either direction specific potential in a specific direction next appears at the output of the operational amplifier. This turns the armature 70 and moves the spool 45 and the ring 91. The bridge composed of resistances 95 through 98 is unbalanced and an unbalance potential appears at the operational amplifier 100 output. The lead 101 applies the output to the operational amplifiers 103. According to the principles of automatic control technology the system assumes an equilibrium condition which is dependent upon the magnitude and sign of the reference input supplied through the lead 102. Accordingly the magnitude of the displacement of the valve spool brought about by the armature 70 is a faithful representative of the reference signal supplied through the lead 102.

Practical experience has shown that the valve construction according to the invention permits adjustment speeds which cause failure of roller bearings. Indeed, it is because the rollers cannot keep up with the required acceleration. Accordingly, the support bearing operates as a simple friction bearing. Since such roller bearings are not designed for this type of action, they are subject to considerable wear or abrasion. In contrast, hydraulic sleeve bearings provide the greatest possible reaction capacity of the moving system with barely noticeable wear or abrasion.

The moment of inertia of the moving coil armature can be reduced still further by winding a self supporting rotor coil without a form and securing the windings to each other with an adhesive.

In contrast to previous regulating valves with hydraulic servo control systems, regulating valves embodying the invention exhibit various noteworthy advantages. They eliminate the need for precision calibrated jets of the servo control system. Thus they require less filtering of the pressure fluid than was hitherto essential. This reduces the cost of the filtering system and a reduction of any pressure loss in the latter. Valves embodying the present invention may utilize filters with 63 micron pore diameters while diameters approximately 5 microns are common in prior art systems. In previous regulating valves the servo control system required a fixed minimum pressure to operate properly. In contrast, as is apparent from the description of the embodiments, regulating valves according to the invention function independently of the pressure. Therefore, the system can utilize a wider range of hydraulic pressure. The quantity of hydraulic fluid normally necessary is not needed in systems embodying the invention. Hence, particularly fine hydraulic efficiencies result.

Another advantage arises from the elimination of complex mechanical adjustment. Tuning or adjustment of the electronic control loop takes place electronically in the simplest possible manner by shifting or varying an adjustable variable resistor.

As can be seen from the drawings, regulating valves embodying the invention are composed of comparatively simple, large, and easily manufacturable components. Therefore, the valves can be produced without specialized production facilities or tooling by average personnel at reasonable costs.

Notwithstanding the above, regulating valves embodying the invention can be produced with high adjustment speeds that match the adjustment speed or response of known regulating valves with a servo amplifier stage. Such speeds lie in the millisecond range. An additional advantage lies in the fact that the mechanical assembly composed of the rotor, valve plug, and position transmission device can be produced as a compact unit which can be inserted in a large number of control loop types. This makes possible a systematic approach to an economical inventory of valve parts.

Magnetically responsive resistors 95 and 96 are of the type available from American Aerospace Controls, Inc. of Farmingdale, New York. Essentially they are magnetically controllable semiconductor resistances composed of Indium antimonide-Nickel antimonide. When introduced in a magnetic field the resistance increases for both field polarities. Linearity exists between current and voltage for each applied magnetic field, that is, the magnetic flux sensitive reistor is an ohmic resistance.

The resistance changes because the semiconductor has internal metallic conducting zones (NiSb - needles). The separation of the zones is several thousandths of a millimeter. If a potential is applied to the semiconductor without a magnetic field the current flow occurs in the direction of the shortest path through the semiconductor. If a magnetic field is applied perpendicular to the semiconductor plane, an entirely different condition arises. Compared to the current direction without the magnetic field, the current paths are deflected by the Hall angle. This turning or deflection of the current paths results in a longer current path which is equivalent to increasing the resistance of the semiconductor.

While specific embodiments of the invention have been shown and described in detail to illustrate the application of the inventive principles, it will be understood that the invention may be embodied otherwise without departing from such principles.

What is claimed is:

1. In an electro-hydraulic regulating valve arrangement responsive to a reference value, comprising a valve casing, a movable valve member movable relative to the casing, hydraulic sleeve bearings, an electric motor having an armature and a stator, position sensing means, an electrical feedback arrangement, said armature having radially directed conductors, said stator being positioned axially of the radially directed conductors so that a major portion of the magnetic field of the stator links with the radially directed conductors, said armature and said movable valve member forming a structural unit supported by said hydraulic sleeve bearings and said sensing means being positioned to sense movement of a portion of said movable valve member, said electrical feedback arrangement being coupled to said sensing means and to said armature for comparing the output of said sensing means with the reference value and energizing the armature on the basis of the comparison.

2. A valve as in claim 1, wherein said armature includes an insulating disc having radially directed windings printed thereon.

3. An arrangement as in claim 2, wherein said sleeve bearings are constructed as hydrostatic bearings.

4. An arrangement as in claim 2, wherein said movable valve member includes a valve spool having a plurality of cylindrical lands, said casing including a cylinder surrounding said lands and supporting said valve spool.

5. An arrangement as in claim 1, wherein said armature includes a flat coil rotatable about an axis and defining a plane passing through the axis and an annular plate coaxial with the axis, said stator having poles extending parallel to the axis and adjacent the radially directed windings, the poles adjacent the windings on one side of the axis having a like polarity and being opposite to the polarity of the poles adjacent the radial windings of the other side of the axis.

6. An arrangement as in claim 5, wherein said movable valve member includes a valve spool having a plurality of cylindrical lands, said casing including a cylinder surrounding said lands and supporting said valve spool.

7. An arrangement as in claim 5, wherein said rotor coil is self-supporting.

8. An arrangement as in claim 1, wherein said sleeve bearings are contructed as hydrostatic bearings.

9. An arrangement as in claim 1, wherein said movable valve member includes a valve spool having a plurality of cylindrical lands, said casing including a cylinder surrounding said lands and supporting said valve spool.

* * * * *